July 9, 1940.  G. C. BROWN  2,207,395
MEASURING AND DISPENSING DEVICE
Filed July 11, 1938  3 Sheets-Sheet 3
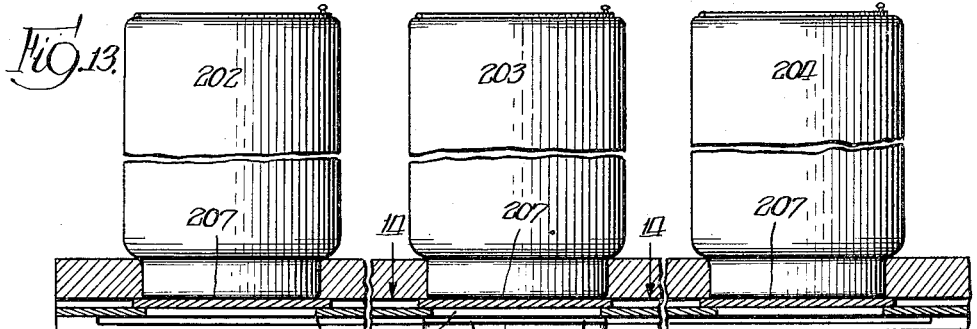
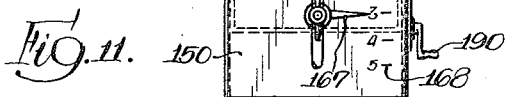
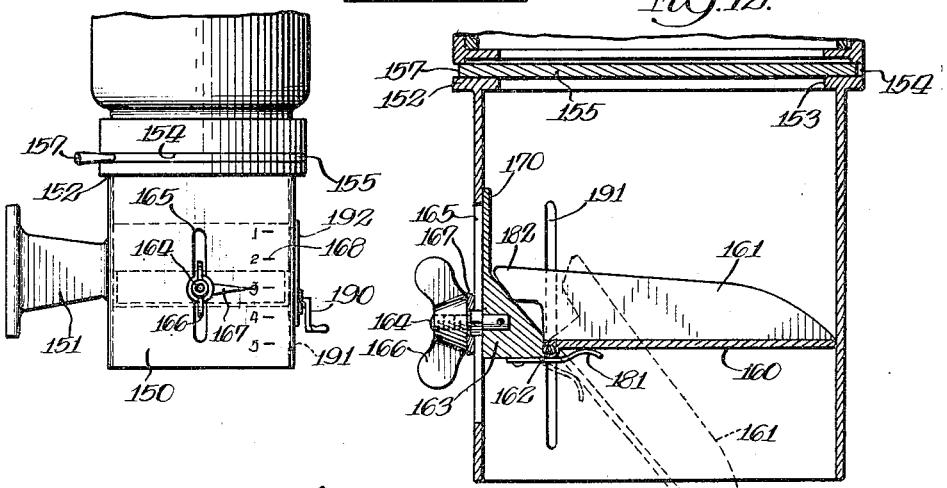
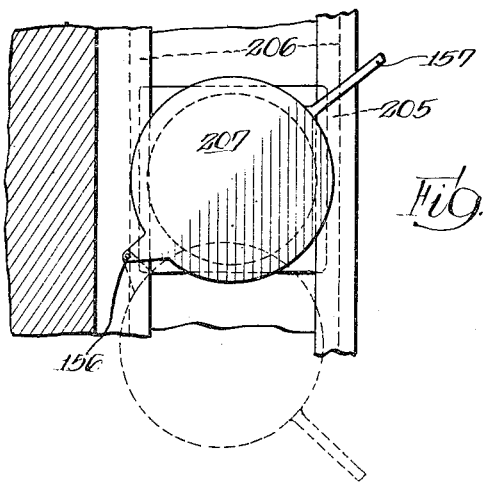
INVENTOR.
George C. Brown.
BY *Wilkinson Huxley Byron & Knight*
ATTORNEYS.

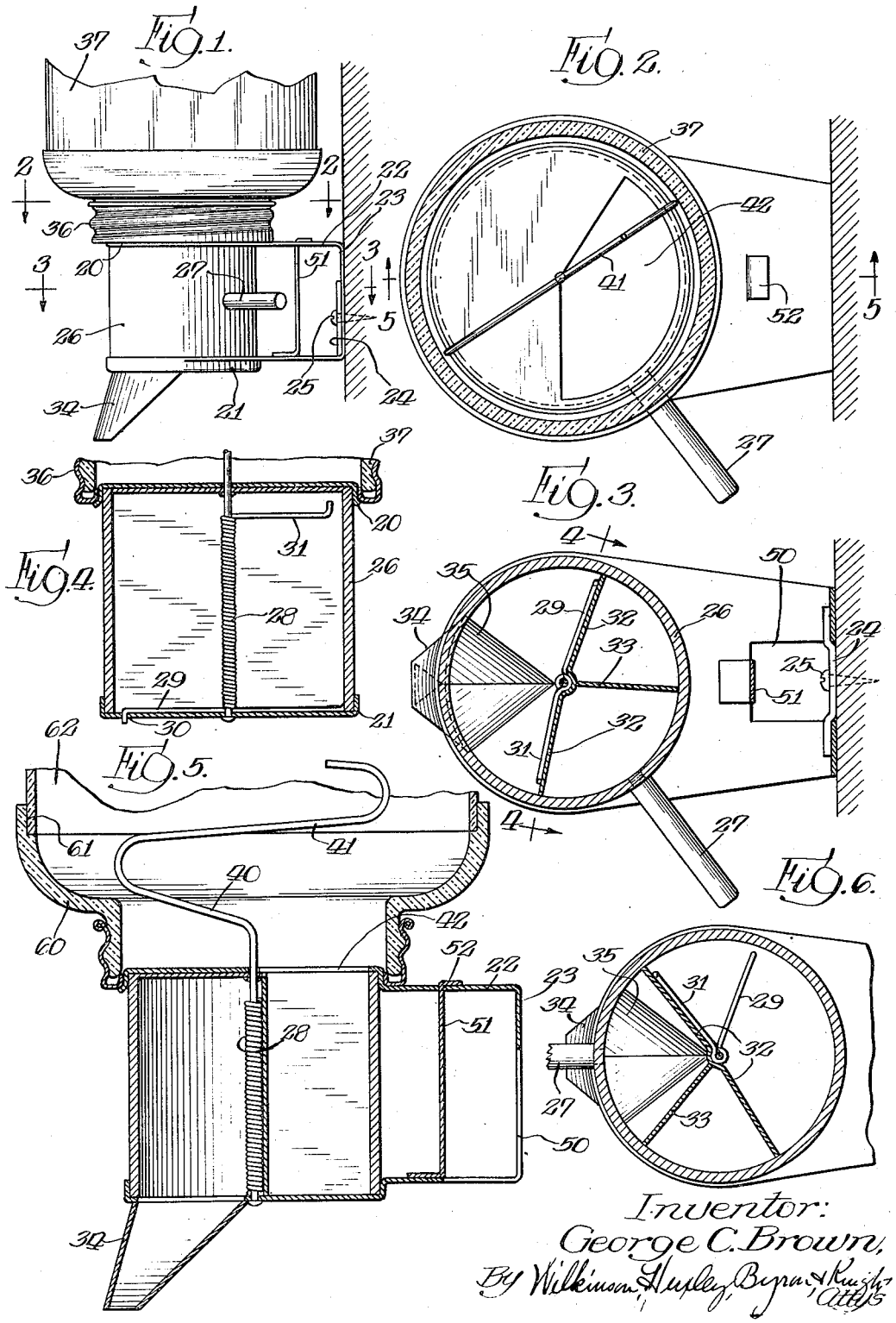

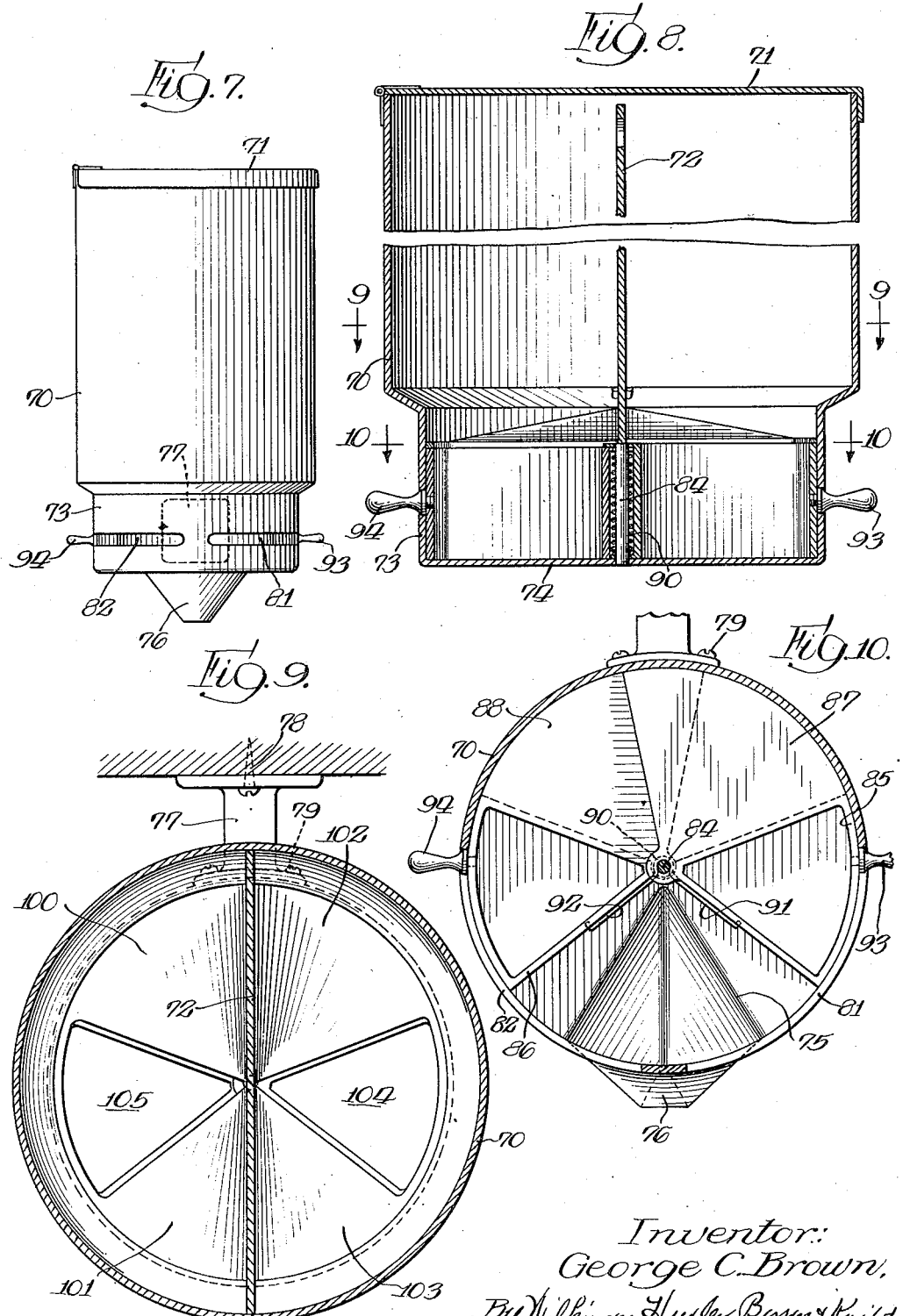

Patented July 9, 1940

2,207,395

UNITED STATES PATENT OFFICE 2,207,395

MEASURING AND DISPENSING DEVICE

George C. Brown, Chicago, Ill.

Application July 11, 1938, Serial No. 218,594

7 Claims. (Cl. 221—109)

The invention relates to measuring and dispensing devices, and particularly to the type of measuring devices adapted for measuring and dispensing finely divided, powdered or granulated materials, such as coffee, sugar, flour and the like.

It is an object of this invention to provide a device which will conveniently measure and dispense a predetermined quantity of any powdered or granulated substance by a simple and convenient operation.

It is a further object of this invention to provide a dispensing device which can be detachably secured to the wall or other suitable support, whereby it may be readily accessible to the operator for convenient use.

A further object of this invention is to provide a measuring device which is adapted to receive and cooperate with the original container of various materials, such as, for example, coffee, and to dispense measured quantities from the original container without the necessity of removing such material from the package in which it is purchased.

A further object of this invention is to provide a measuring and dispensing device of the above-mentioned type, which may selectively measure, at the will of the operator, one, two, three or more cups or other units of measure.

These and other objects not specifically enumerated are contemplated for this invention, as will readily appear to one skilled in the art as the following description proceeds.

Referring to the drawings—

Figure 1 is an elevational view of a measuring and dispensing device constructed in accordance with this invention;

Figure 2 is a plan view, partly in cross-section, taken on the line 2—2 of Figure 1 and looking in the direction of the arrows;

Figure 3 is a cross-sectional view taken on the line 3—3 of Figure 1 and looking in the direction of the arrows;

Figure 4 is a cross-sectional view taken on the line 4—4 of Figure 3 and looking in the direction of the arrows;

Figure 5 is an enlarged cross-sectional view taken on the line 5—5 of Figure 2 and looking in the direction of the arrows;

Figure 6 is a view similar to Figure 3 showing the parts thereof in a different position as when one of the compartments is discharging the measured contents;

Figure 7 is a side elevational view of a modified form of this invention;

Figure 8 is an enlarged cross-sectional view of the device shown in Figure 7;

Figure 9 is a cross-sectional view taken on the line 9—9 of Figure 8 and looking in the direction of the arrows;

Figure 10 is a cross-sectional view taken on the line 10—10 of Figure 8 and looking in the direction of the arrows;

Figure 11 is an elevational view of a still further modification of this invention;

Figure 12 is an enlarged sectional view of the device as shown in Figure 11;

Figure 13 is an elevational fragmentary view showing an additional modification in which one measuring and dispensing unit is provided for several compartments or storage containers; and Figure 14 is a plan section taken on the line 14—14 of Figure 13 and looking in the direction of the arrows.

By referring to the drawings, it will be noted that the invention as illustrated in Figures 1 to 6 is embodied in a measuring and dispensing device having an upper part 20 and a lower part 21, each of which is formed integrally with the bracket member 22, which has a vertical portion 23 adapted to cooperate with a holding plate 24 which is preferably held to the wall or other support by means of screws 25. The bracket member 22 is of general U-shape and may be formed of one piece, with the upper and lower parts formed with opposed concavities of the form illustrated in Figure 4. Positioned between the upper and lower members is a cylindrical measuring device 26, which has a radially extending handle 27 projecting therefrom.

Centrally disposed within the measuring compartment is a rod or axle about which is disposed a spring 28 having one end extending radially, as at 29, for engagement in the opening 30 in the bottom member 21 and its opposite end 31 disposed radially, as shown in Figure 4, for contact with a partition 32 in the cylindrical measuring device. The partition 32 extends across the interior of the cylindrical measuring device, which is also preferably provided with a second partition 33 arranged substantially as shown in Figures 3 and 6.

The bottom member 21 is provided with a spout or discharging nozzle 34 which communicates at its upper end with an opening 35 in the bottom member 21.

The upper member 20 may be provided with any suitable means for holding a container, but, as here illustrated, has secured to it a threaded sleeve 36 which is adapted to receive a jar 37 for containing the substance to be measured and dispensed. This sleeve may be made with a screw thread 36 similar to the thread on the tops of ordinary jars or containers whereby the usual type of jar or container may be used for holding the substance to be dispensed, but, of course, any other type of jar or container may be employed. It is only necessary to this invention that the upper circular member be equipped with a suitable connection to receive the proper jar or container.

It is also conceivable that a non-removable container may be employed which will have a cover at its top whereby the same may be filled through the top without being removed from the measuring and dispensing device.

It will be noted that the arm 29 of the spring is so positioned within the measuring cylinder as to provide a stop which limits the movement of the measuring device by engaging one arm of the partition 32 when it is moved in a counter-clockwise direction to its maximum position as illustrated in Figure 3. Furthermore, it will be observed that by engaging the handle 27 and rotating the cylindrical device in a clockwise direction the same may be moved against the tension of the spring to a new position which will bring either one or the other of the measuring compartments over the discharge opening 35. The measuring compartments are so made that when they have been turned through approximately 180° the opposite arm of the partition 32 abuts the end 29 of the spring 28 to arrest the movement in the clockwise direction. In the maximum clockwise position the other compartment, that is, the smaller one of the two, is disposed over the discharge opening 35.

As clearly shown in Figure 5, the central rod or axle may be extended upwardly as at 40 and bent into a suitable stirring or agitating device 41, which extends into the container or jar for preventing clogging or caking of the material to be dispensed.

In the case of coffee or sugar, for instance, this stirring device will cause the material to freely flow into the measuring and dispensing mechanism so as to fill the measuring compartments through the opening 42 in the top member 20. This opening 42 is so disposed as to overlie the measuring compartments so that both compartments will be filled by gravity, aided by the stirring device. As a result of this construction, the measuring compartments are always completely filled when they are in the maximum counter-clockwise position, as illustrated in Figure 3. It is apparent that the operator may then move either one or both of the compartments to a position to overlie the discharge opening 35, whereby the contents of either one or both of these compartments is caused to be discharged through the nozzle or spout 34.

The device illustrated is particularly adapted for dispensing coffee and one compartment may be made of sufficient size to measure the quantity of coffee required for two cups of coffee, whereas the other compartment may be of sufficient size to dispense the required amount of coffee for one cup of coffee. By this means, the amount of coffee required for either one, two, three, four or five cups, or any multiple thereof may be dispensed at will by merely multiplying the operation in the required way.

Any suitable attaching bracket may be employed, but in the present instance it has been found convenient to provide an opening 50 struck from the vertical portion 23 of the bracket 22 which also extends to the bottom wall of said bracket, as shown in Figure 5. This provides a slot which extends only part of the way up the vertical back wall of the bracket so that it may be placed over a holding plate 24 in the manner clearly illustrated in Figure 3. A portion of the metal struck from the bracket to provide the opening 50 may be bent upwardly to serve as a strengthening strap 51 connecting the lower and upper portions of the bracket. The upper end of this support may be extended through the top part of the bracket and bent over, as at 52, in the manner illustrated.

As shown in Figure 5, an adapter or equivalent means 60 may be threaded into the top of the dispensing device in place of the threaded end of a jar, which adapter may be made of any suitable material and constricted at its upper edge, as at 61, to receive the end of a container 62, which may be the original container in which the material to be dispensed is shipped and purchased. In the case of coffee, for instance, this may be the original coffee can which can be opened and attached to the dispensing device in the manner indicated by merely forcing the upper edge thereof into the adapter or similar means for attaching the same to the dispensing mechanism. By virtue of the fact that the dispensing mechanism is removable as a unit from the bracket on the wall, the same may be taken off, inverted and applied to the top of the can and thereafter the device and can turned back to the upright position so that the contents of the can may be fed by gravity into the dispensing device. When the can is empty, the unit may be again removed from the wall bracket and the container removed and replaced in substantially the same manner.

In the modification shown in Figure 7 a slightly different construction is employed, in that a permanent container 70 is provided which may have a hinged top 71 and a partition 72. This partition divides the device into two separate compartments, whereby it is adapted to discharge two separate substances; for instance, coffee and sugar may be separately dispensed from the same mechanism. The bottom of the container preferably terminates in a cylindrical member 73 having a bottom 74 which is provided, as shown in Figure 10, with an outlet opening 75 discharging into a nozzle or spout 76 which extends outwardly in a position readily accessible to the user.

At the rear of the mechanism is preferably an attaching bracket 77 which may be held against the wall or other support by means of screws 78. This bracket may be affixed to the device in any suitable manner, such as by screws 79.

The cylindrical portion 73 is equipped with a pair of slots 81 and 82 adjacent the front portions thereof, which slots have their forward ends slightly spaced apart. Inside of the cylindrical member 73 is a central shaft 84 on which are pivoted segmentary measuring devices 85 and 86, respectively, each of which is equipped with a horizontally disposed partition member also of segmental shape. The partition for the measuring device 85 is designated 87 in the drawings and is disposed above the horizontal segmental partition 88 which is fixed to travel with the measuring device 86.

Extending around the shaft 84 is a spring 90 which has its upper ends extending radially outwardly, as at 91 and 92, for engagement against the sides of the measuring devices 85 and 86, respectively. This spring is so wound as normally to urge the measuring devices into the positions which they occupy in Figure 10 or, in other words, so that the measuring device 85 is in its maximum counterclockwise position and the measuring device 86 is in its maximum clockwise position. The movement of these measuring devices in their respective positions is limited by the engagement of the handles 93 and 94 in their respective slots 81 and 82.

As shown in Figure 9, the container 70 is equipped with inclined flooring members 100 and 101 on one side of the partition 72, and 102 and 103 on the opposite side of the partition 72. Each pair of flooring members is inclined toward the segmental opening with which they are associated. The opening 104 overlies the measuring device 85, whereas the opening 105 overlies the measuring device 86. It will be noted that the openings are substantially coextensive with the measuring devices and are so disposed as to overlie exactly the measuring devices when they are in their normal positions of rest, as shown in Figure 10.

It will be noted that each of the segmental partitions 87 and 88 extends a sufficient number of degrees around the circumference of the measuring device to cover the particular outlet opening 104 or 105 with which it is associated. In this way, after the measuring device is moved from its normal position toward the discharge outlet, the supply of additional material from the container is cut off until the measuring device is once more brought back to its normal position underlying its associated opening.

It will thus be apparent that this device may be located in any convenient manner, and by simply removing the handle 93 or 94 (according to which material is wanted) in its respective slot to the forward extreme position, the measured quantity of the particular material is brought forward to a position where it exactly overlies the discharge spout, from whence it is caused to fall by gravity into a container or other means held below the discharge spout. On releasing the handle, the spring restores the particular measuring device to its normal position.

When the materials in the container are depleted, the same may be replenished by removing the cover 71 and introducing more material through the upper opening.

In the modification shown in Figures 11 and 12, a slightly different form of the invention is illustrated, which comprises a rectangular member 150, which may be mounted against the wall or other supporting surface by means of a bracket 151, secured by any suitable means (not shown). The rectangular member 150 preferably terminates at its upper edge in a member 152 which is adapted to receive a container for holding the material to be dispensed. This container may be a part of the device or may be the original container in which the material is supplied.

Inside of the member 152 is a floor or partition 153 equipped with an opening 154 below which a pivoted disk 155 is positioned for oscillatory movement on a suitable pivot 156 by means of a handle 157. This pivot is preferably equipped with a spring 158 which tends to restore the disk to its normal position to close off the opening 154. However, when desired, the operator may move the handle 157 against the spring tension to cause the disk to move outwardly through a suitable slot located in the side of the member 152, whereby to permit the material to flow down into the rectangular member 150.

Mounted in the rectangular member is a movable flooring 160 provided with aprons 161 on either side thereof so as to form a dumping chute. This flooring is mounted on a pivot 162 which is carried by a vertically adjustable member 163 having a threaded member 164 extending outwardly through a slot 165 in the side wall of the rectangular member 150. This threaded member is equipped with a wing nut 166 which is readily adjusted in any desired position.

Also the threaded member 164 preferably carries an indicating pointer 167 which is directed in close proximity to the scale 168 marked on the side of the rectangular device 150.

Carried by the member 163 is a shield 170 which underlies the slot so as to cover the same from the inside. It will be apparent that by loosening the wing nut 166 and using the same as a handle that the flooring 160 may be adjusted up or down with the member 163 to any desired position indicated on the scale 168.

The flooring 160 is hingedly connected to the member 163 by means of a pivot 162 and has a spring 181 urging the same to its upward position. The maximum upward position is limited by the extensions 182 of the aprons abutting against the inner surface of the member 163. The spring is of sufficient strength to hold the flooring in elevated position even though the weight of the maximum measured quantity of material may also be supported thereon.

For dumping the measured material, the pivot 162, which may be formed of wire or other suitable material, is extended laterally to form a crank 190 extending through the wall of the rectangular member 150 and disposed to move up and down in the slot 191 which may be covered by a shielding member 192.

In operation, the material placed in the container at the top of the device may be dispensed in any predetermined quantity within limits. To perform this operation, the user first loosens the wing nut 166 and adjusts the member 163 with its floor 160 to the desired vertical position to give the wanted quantity of material. After the position is selected, the wing nut 166 is tightened. Thereafter the handle 157 is oscillated against the tension of the spring 158 to cause a quantity of the material in the upper container to fall downwardly onto the floor 160 and to fill up the space determined by the vertical position of the floor. When this particular space has been filled, the handle 157 is allowed to resume its normal position to cut off the further flow of material. Thereupon, the crank 190 may be oscillated to cause the floor to tilt downwardly to discharge the material thereon into a suitable container held below the rectangular mechanism 150. The member 163 has sloping upper surface so as to shed the material.

In the modification shown in Figure 13, the measuring device is similar to that illustrated in Figures 11 and 12 except that it is mounted on the underside of a slide carriage 200 which underlies a support 201 on which are mounted a plurality of different containers 202, 203 and 204, respectively. Any number of containers may be employed. Each container has a disk member 207 underlying its opening which in structure and operation is like the disk member 155 of the device illustrated in Figure 12. The measuring device is equipped with lugs 205 adjacent the top adapted to slide in grooves 206, whereby the same may be selectively brought under the discharge opening of any one of the containers of the group.

When the measuring device is disposed beneath any particular container, the adjustment is made to give the desired quantity and the disk is oscillated in the manner heretofore described in connection with the device illustrated in Figures 11 and 12. Thus, the construction and operation are substantially the same except that the measuring device is movable to underlie any one of a plurality of different containers so as to discharge the different materials fed from each of the containers respectively.

I claim:

1. A measuring and dispensing device of the class described, comprising a pair of opposed members; a connecting strap therebetween forming a supporting bracket; an oscillatable measuring member disposed between said opposed members; a container above the upper of said opposed members for containing a powdered or similar material to be dispensed and an opening connecting said container and said measuring member; an outlet opening in the lower of said opposed members; said measuring device being adapted to cooperate with the opening in the upper of said opposed members in one position and to cooperate with said outlet opening in another position; a handle for moving said measuring device and a spring for resisting the movement thereof in one direction, said spring having one end secured to one of said opposed members and forming a stop to limit the movement of said measuring device in both directions.

2. A measuring and dispensing device, comprising a pair of spaced members each having a cylindrical recess therein and each being disposed opposite to the other, means connected to said members, respectively, for maintaining said members in predetermined spaced relation, a cylindrical measuring device mounted with its end portions in said cylindrical recesses, respectively, and being adapted to oscillate therein on its own axis and having an outside wall exposed between said members, each of said members having an opening therethrough for feeding material, respectively, to and from said measuring device, means for mounting a container above one of said members for holding a supply of material to be fed to said measuring device, means connected to said measuring device for manually imparting oscillating motion thereto, and a spring for returning said manual device to normal position.

3. A measuring and dispensing device, comprising a pair of spaced members each having a cylindrical recess therein and each being disposed opposite to the other, means connected to said members, respectively, for maintaining said members in predetermined spaced relation, a cylindrical measuring device mounted with its end portions in said cylindrical recesses, respectively, and being adapted to oscillate therein on its own axis and having an outside wall exposed between said members, each of said members having an opening therethrough for feeding material, respectively, to and from said measuring device, means for mounting a container above one of said members for holding a supply of material to be fed to said measuring device, means connected to said measuring device for manually imparting oscillating motion thereto, a spring for returning said manual device to normal position, and stop means for limiting the movement of said measuring device whereby in one extreme position it receives material from said container and in another position it discharges said material through the opening in the lower of said two members.

4. A measuring and dispensing device, comprising a pair of spaced members each having a cylindrical recess therein and each being disposed opposite to the other, means connected to said members, respectively, for maintaining said members in predetermined spaced relation, a cylindrical measuring device mounted with its end portions in said cylindrical recesses, respectively, and being adapted to oscillate therein on its own axis and having an outside wall exposed between said members, each of said members having an opening therethrough for feeding material, respectively, to and from said measuring device, means for mounting a container above one of said members for holding a supply of material to be fed to said measuring device, means connected to said measuring device for manually imparting oscillating motion thereto, and a shaft connected to said measuring device adapted for oscillatory movement therewith having a portion extending through the upper of said two members and into the container, said portion in said container being shaped to form an agitator.

5. A measuring and dispensing device, comprising a pair of spaced members each having a cylindrical recess therein and each being disposed opposite to the other, means connected to said members, respectively, for maintaining said members in predetermined spaced relation, a cylindrical measuring device mounted with its end portions in said cylindrical recesses, respectively, and being adapted to oscillate therein on its own axis and having an outside wall exposed between said members, each of said members having an opening therethrough for feeding material, respectively, to and from said measuring device, means for mounting a container above one of said members for holding a supply of material to be fed to said measuring device, means connected to said measuring device for manually imparting oscillating motion thereto, a shaft connected to oscillate with said measuring device, and a helical spring surrounding said shaft having one end engaged with said measuring device and its other end connected to one of said members.

6. A measuring and dispensing device, comprising a pair of spaced members each having a cylindrical recess therein and each being disposed opposite to the other, means connected to said members, respectively, for maintaining said members in predetermined spaced relation, a cylindrical measuring device mounted with its end portions in said cylindrical recesses, respectively, and being adapted to oscillate therein on its own axis and having an outside wall exposed between said members, each of said members having an opening therethrough for feeding material, respectively, to and from said measuring device, means for mounting a container above one of said members for holding a supply of material to be fed to said measuring device, means connected to said measuring device for manually imparting oscillating motion thereto, a shaft connected to oscillate with said measuring device, and a helical spring surrounding said shaft having one end engaged with said measuring device and its other end connected to one of said members, a portion of said spring serving as a stop for the oscillatory motion of said measuring device.

7. A measuring and dispensing device, comprising a pair of spaced members each having a bearing therein for receiving a shaft, a measuring device mounted on said shaft adapted for oscillatory movement between said members, said measuring device having an exposed side wall and means associated therewith for imparting manual oscillatory movement to said measuring device, each of said members having openings therethrough for feeding material, respectively, to and from said measuring device, and a helical spring surrounding said shaft and having one portion connected to said measuring device and another portion connected to one of said members.

GEORGE C. BROWN.